(12) United States Patent
Ouchi

(10) Patent No.: US 6,765,705 B2
(45) Date of Patent: Jul. 20, 2004

(54) OPTICAL UNIT AND IMAGE DISPLAY DEVICE USING THEREOF

(75) Inventor: Satoshi Ouchi, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/303,736

(22) Filed: Nov. 26, 2002

(65) Prior Publication Data
US 2003/0072084 A1 Apr. 17, 2003

Related U.S. Application Data

(63) Continuation of application No. 09/943,755, filed on Sep. 4, 2001, now Pat. No. 6,493,149.

(30) Foreign Application Priority Data
Apr. 27, 2001 (JP) ......................................... 2001-130799

(51) Int. Cl.⁷ ............................ G02B 27/14; G02B 26/08
(52) U.S. Cl. ......................... 359/216; 359/634; 359/212
(58) Field of Search ................................ 359/201, 204, 359/212, 216, 223, 464, 462, 209, 211, 634, 649, 636, 640, 619; 353/31, 34, 37, 7–9; 349/7, 8, 5, 15; 348/51, 54–56, 335–336, 338–339, 744

(56) References Cited

U.S. PATENT DOCUMENTS

| 6,317,170 B1 | 11/2001 | Hwang et al. ............... 359/621 |
| 6,330,112 B1 | 12/2001 | Kaise .......................... 348/750 |
| 6,411,440 B2 | 6/2002 | Ohuchi et al. ............... 359/621 |
| 6,511,184 B2 * | 1/2003 | Yamagishi et al. ........... 353/31 |

FOREIGN PATENT DOCUMENTS

| JP | 06-295159 | 10/1994 |
| KR | 1998-020617 | 6/1998 |

* cited by examiner

Primary Examiner—Hung Xuan Dang
Assistant Examiner—Joseph Martinez
(74) Attorney, Agent, or Firm—McDermott Will & Emery LLC

(57) ABSTRACT

A single plate type optical unit and display device to utilize light with high efficiency in a simple method is configured so a dichroic mirror separates light into a plurality of colors, and the plurality of colors of light reflected by the dichroic mirror are beamed onto a rotating multisurface element, the plurality of colors of light emitted from the rotating multisurface element are each beamed onto different locations on the display element, and by rotating the rotating multisurface element, the plurality of colors of light are moved in one direction along the display element, and a color image is beamed from a projection lens.

6 Claims, 12 Drawing Sheets

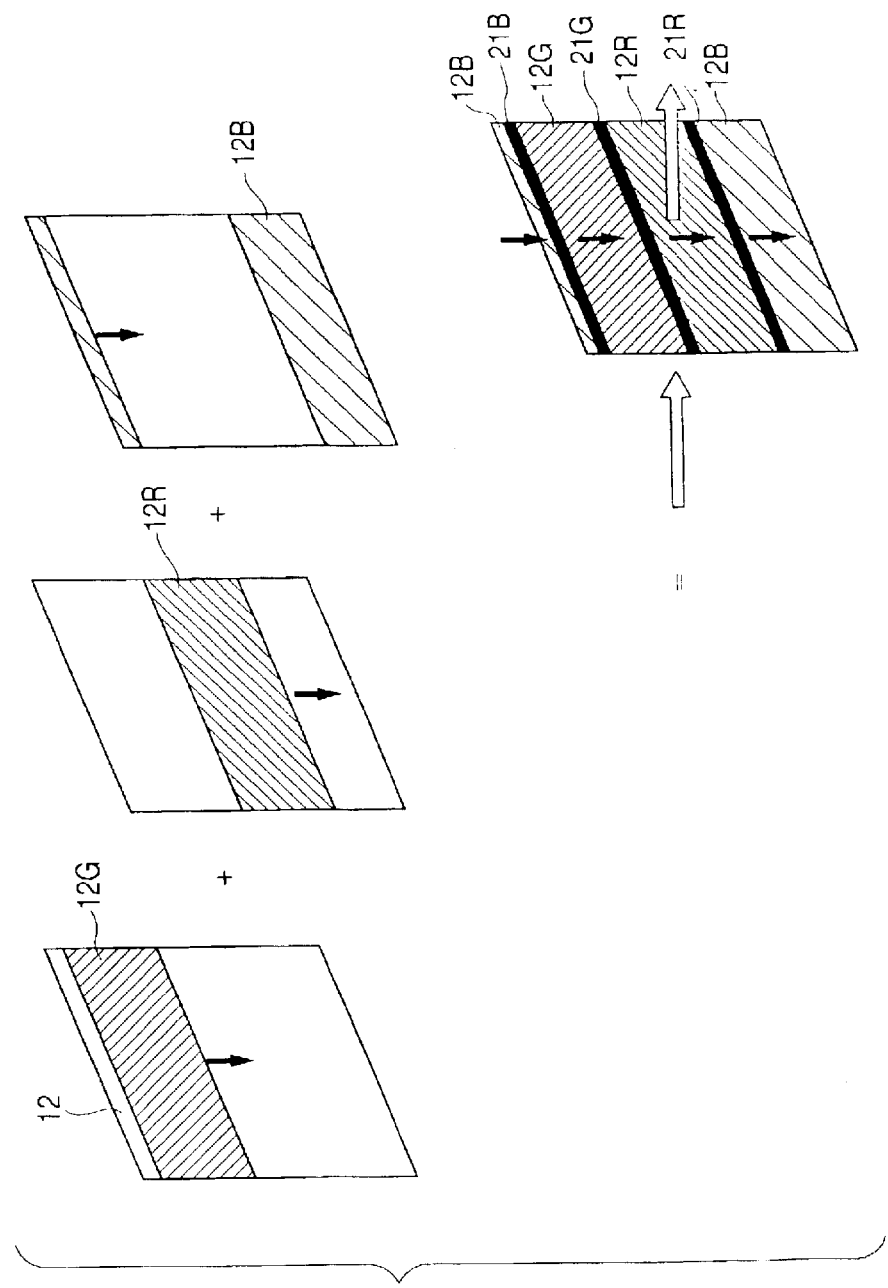

OPTICAL UNIT AND IMAGE DISPLAY DEVICE USING THEREOF

This application is a continuation of application Ser. No. 09/943,755 filed Sep. 4, 2001 now U.S. Pat. No. 6,493,197.

BACKGROUND OF THE INVENTION

1. Field of the Invention

The present invention relates to projection devices such as liquid crystal projectors, projection image display devices and optical engines such as reflective image display projectors and beam type rear projection television for projecting images on a screen using light pipe devices such as liquid crystal panels or image display elements, and relates in particular to technology for beaming a plurality of light colors onto different light pipe element locations using a rotating multisurface element, and changing the beaming locations in sequence.

2. Description of the Related Art

An optical unit is known in the related art for passing light from a light source through a first and a second array lens, a polarized beam splitter (PBS) and a collimator lens, and then separating the light into red light, blue light and green light by using a plurality of dichroic mirrors, and then changing the optical paths of each separated (colored) light by means of respective rotating prisms and beaming each light onto respectively different locations on a light pipe element (hereafter simply referred to as a display element or image display element) and also scroll each light beam in sequence in a fixed direction on the display element locations.

SUMMARY OF THE INVENTION

The above described optical unit of the related art possessed the advantage that assembly of the single plate utilized by the display element was simple. However the optical unit had to be made large in size since a plurality of prisms were required. Further, besides having a high price due to use of a plurality of rotating prisms, a large number of lenses and many dichroic mirrors, the light utilization efficiency was poor because of the many lenses that were used. Also, the rotation phase of a plurality of rotating prisms had to be aligned in order to adjust the display element positions upon which the red, green and blue light were beamed and this alignment was difficult. Furthermore, noise prevention methods were needed due to the plurality of motors being used.

The present invention therefore has the object of providing a compact and low-priced optical unit.

Another object of the present invention is to provide novel and effective image display technology, allow simple position alignment for a plurality of light beamed onto a display element, and provide good light utilization efficiency.

To achieve the above objects of the invention, the optical unit is comprised of a light source, a display element to form an optical image according to an image signal from the light emitted from the light source, a light color separator means for separating the light emitted from the light source into a plurality of light colors, a rotating multisurface element input with a plurality of light colors emitted by the light color separator means for changing the optical path and beaming the plurality of light colors onto different locations on the display element while scrolling the light beam in one direction, and a projection device to light emitted from the display element as a color image.

BRIEF DESCRIPTION OF THE DRAWINGS

FIG. 2 is perspective views of the display element for describing the status of the beam of three-colored light on the display element.

DETAILED DESCRIPTION OF THE PREFERRED EMBODIMENTS

The embodiments of the present invention are hereafter described while referring to the work drawings.

Figure 1:
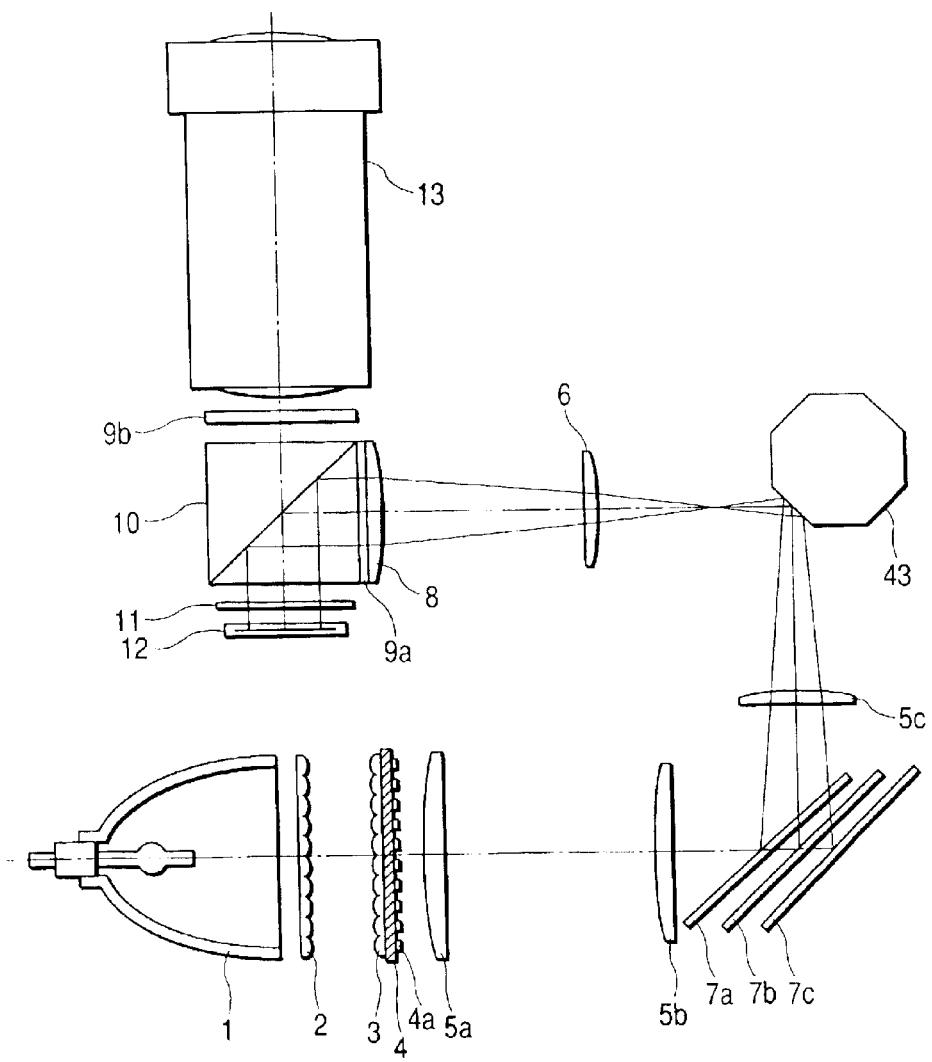
FIG. 1 is structural views showing the first embodiment of the optical unit of the invention.

FIG. 1 is structural views showing the first embodiment of the optical unit of the invention.

In this figure, the light emitted from the light source 1 obtained after reflection from a reflector is input to a first array lens 2 for forming a plurality of secondary light source images, and then passed through a second array lens 3 formed by a plurality of focusing lenses and installed in the vicinity of the second light source image, for forming lens images for each of the first array lenses 2 in the liquid crystal display element 12. The mixed light of P polarized light and S polarized light that passed through the second array lens 3, the S polarized light for example is aligned by the polarized beam splitter 4 (hereafter referred to simply as PBS) and the λ/2 wavelength plate 4a, and passed through the first collimator lens 5a and second collimator lens 5b and the light respectively reflected as red light, green light and blue light by the red dichroic mirror 7a for reflecting red light, the green dichroic mirror 6b for reflecting green light, and the B dichroic mirror or reflecting mirror 7c (hereafter referred to as dichroic mirror group) for reflecting B light. The red light, green light and blue light respectively pass through the third collimator lens 5c, and irradiate different locations on the respective reflecting rotating polygonal mirrors 43, and are reflected from the reflecting rotating polygonal mirrors 43. In this embodiment, the reflecting rotating polygonal mirrors 43 has eight surfaces however there is no restriction on the number of surfaces. The dichroic mirror group 7a, 7b, and 7c in this embodiment is the three colors red, blue and green. However a combination of red, green blue and white, or yellow, cyan, magenta, or a combination of yellow, cyan, magenta or a combination of red, yellow, green cyan and magenta, or red and orange, or green, blue and violet may be used. In such cases, the dichroic mirror group constituting the color separator means may consist of a plurality of plates such as three or more plates. In this case, the scroll zone on the display element may be three or more types.

In the case of two-plate type optical unit (each plate installed respectively on one of the two surfaces of a cube type PBS utilizing 2 display elements), a structure may be used where only the scrolling light arrives on the first display element via the rotating polygon mirror, and the remaining non-scrolling light is made to arrive directly on the second display element by way of a fixed mirror and a lens.

When the red light, green light and blue light are reflected from one surface of the reflecting rotating multisurface element 43, their respective optical paths intersect. When any of the red light, green light, and blue light are reflects as two lights from one surface of the reflecting rotating multisurface element 43, then the optical paths of their light intersect (related later on while referring to FIG. 4, FIG. 5). The red light, green light and blue light emitted from the reflecting rotating multisurface element 43 pass through the converging lens 6, the condensing lens 8, and the polarizing plate 9a and after reflecting from the PBS 10, pass through the λ/4 wavelength plate 11 and are beamed on different locations on the display element 12. P polarized light converted from the S polarized light emitted from the display element 12 passes through the PBS1.0, and after further permeating through the polarizing plate 9b, is displayed as an enlarged image on the screen (not shown in drawing) by way of the projection lens 13.

Any of a transmissible liquid crystal device, a reflecting liquid crystal display element, a ferroelectric liquid crystal device as well as a micro-mirror image display element may serve as needed, as the display element of the present invention. In the present embodiment, the reflecting liquid crystal display element or the ferroelectric liquid crystal device can be used as the display element 12.

In the embodiment of FIG. 1, the optical paths of the red light, green light and blue light reflected by the dichroic mirror group 7a, 7b, 7c are aligned so that the red light, green light and blue light are beamed onto the specified locations on the display element 12. Also, the size and number of rotating polygonal mirrors is determined so that when the rotating multisurface element 43 has rotated these optical paths, the red light, green light and blue light can be moved at approximately the same speed in one direction.

Further, a combination of dichroic prisms and reflecting mirrors can be used instead of the dichroic mirror group 7a, 7b, 7c, to separate the red light, green light and blue light and control the optical axis with reflecting mirror.

The light beam (irradiation) status of the red light, green light and blue light at the time of reflection from the reflecting rotating multisurface element 43 onto the display element 12 is next described while referring to FIG. 2.

FIG. 2 is an oblique view of the display element for describing the beaming of the three color light on the display element. In FIG. 2, 12R is the location where the red light is beamed upon, 12G is the location where the green light is beamed, and 12B shows the location where the blue light is beamed. The blue light, green light and red light are beamed upon the display element 12 simultaneously. Here, 21R, 21G and 21B are respectively the locations where the red light, green light and blue light are next beamed, and the address for beaming the red light, green light and blue light is performed. The size of that location is determined by the write time of the display element 12, namely, the response time of the display element 12 and the scroll speed so that even one line is sufficient when the response time is sufficiently faster than the movement time for scrolling one line. When the response time is slow, a number of lines is assigned to match that response time.

When first beaming these lights from above by scrolling along the display element 12, each color is written in sequence from above, as information matching each color in the respective address in locations 12R, 12G and 12B, and the red light, green light, blue light is then beamed in sequence from above on each color area on the display element 12. During that time, addresses are written in the locations 21R, 21G and 21B. When the address writing in the locations 21R, 21G and 21B is complete, the red light, green light, blue light beaming on the respective locations 12R, 12G and 12B moves downward along the display element 12 just by an amount corresponding to the locations 21R, 21G and 21B, and red light, green light, blue light beams (irradiates) on the locations 21R, 21G and 21B. When writing in the locations 21R, 21G and 21B is complete, address writing is then performed on the lower line. The locations irradiated by the red light, green light and blue light in this way move downward in sequence.

The size of the locations 12R, 12B and 12B are approximately the same in this embodiment, so the lens shapes of the first array lens 2 are formed to resemble the light band shape of the red, green or blue light beaming on the locations 12R, 12G and 12B on the display element 12.

The second embodiment of the present invention is next described while referring to FIG. 3 through FIG. 5.

Figure 3A:
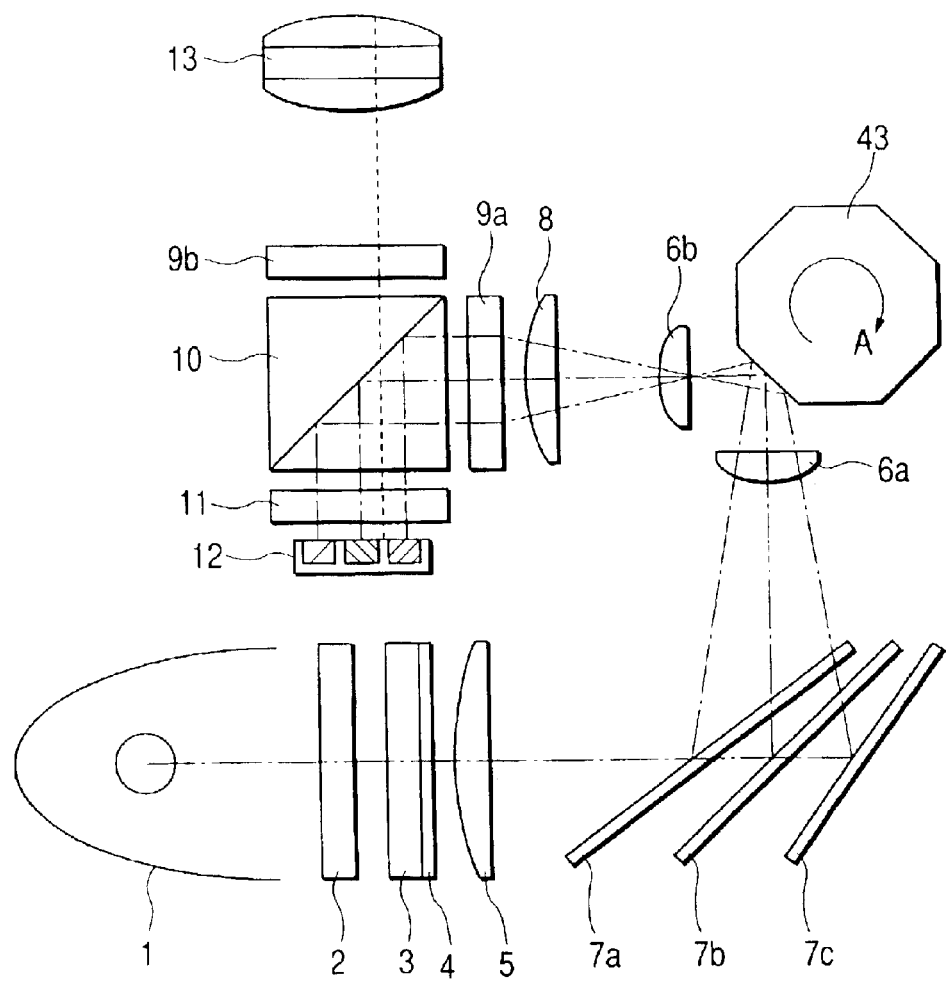
FIG. 3 is structural views showing the second embodiment of the optical unit of the invention and a flat view of the display element.
Figure 3B:
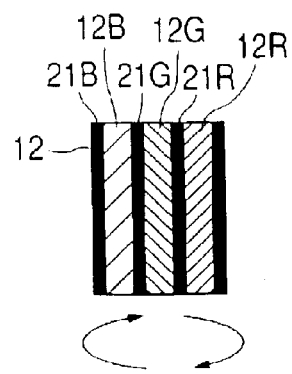
Figure 4A:
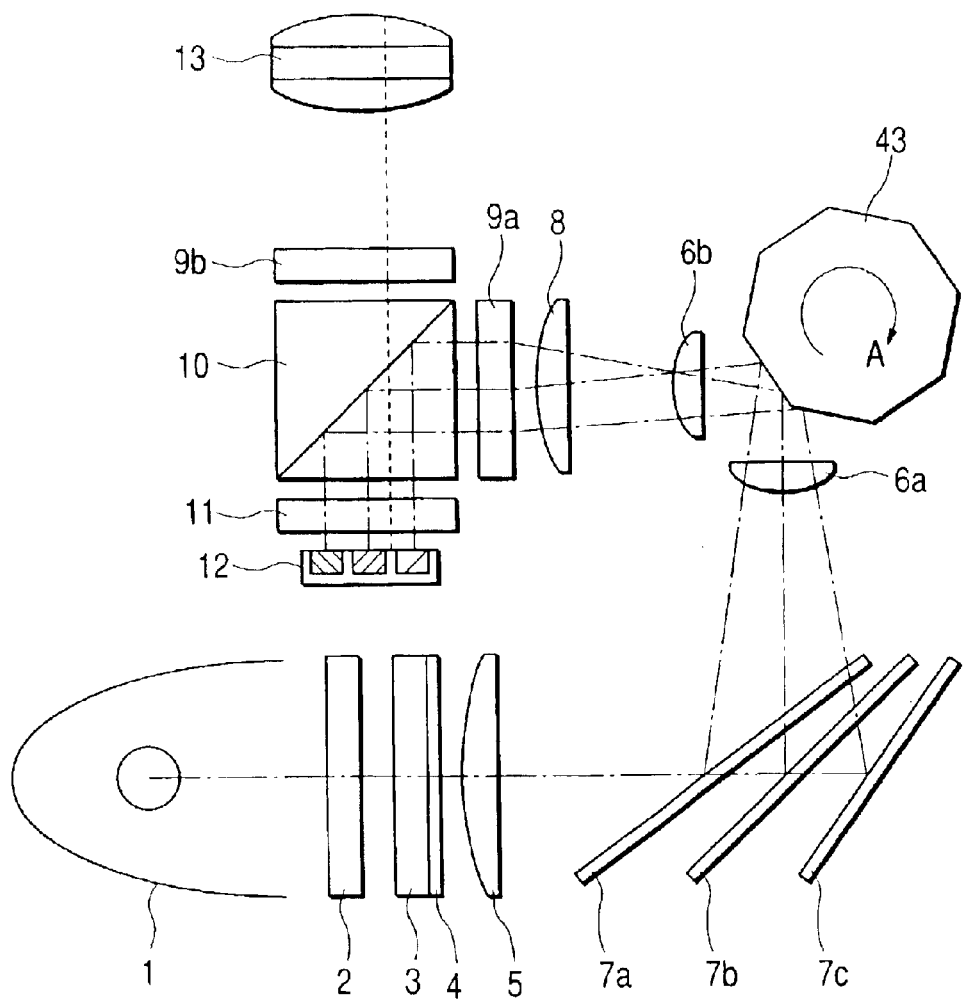
FIG. 4 is structural views showing the second embodiment of the optical unit of the invention and a flat view of the display element.
Figure 4B:
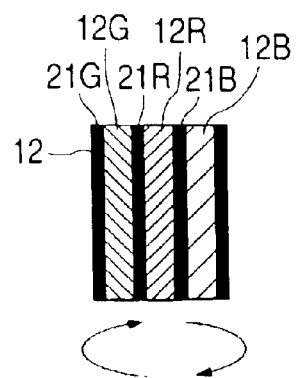
Figure 5A:
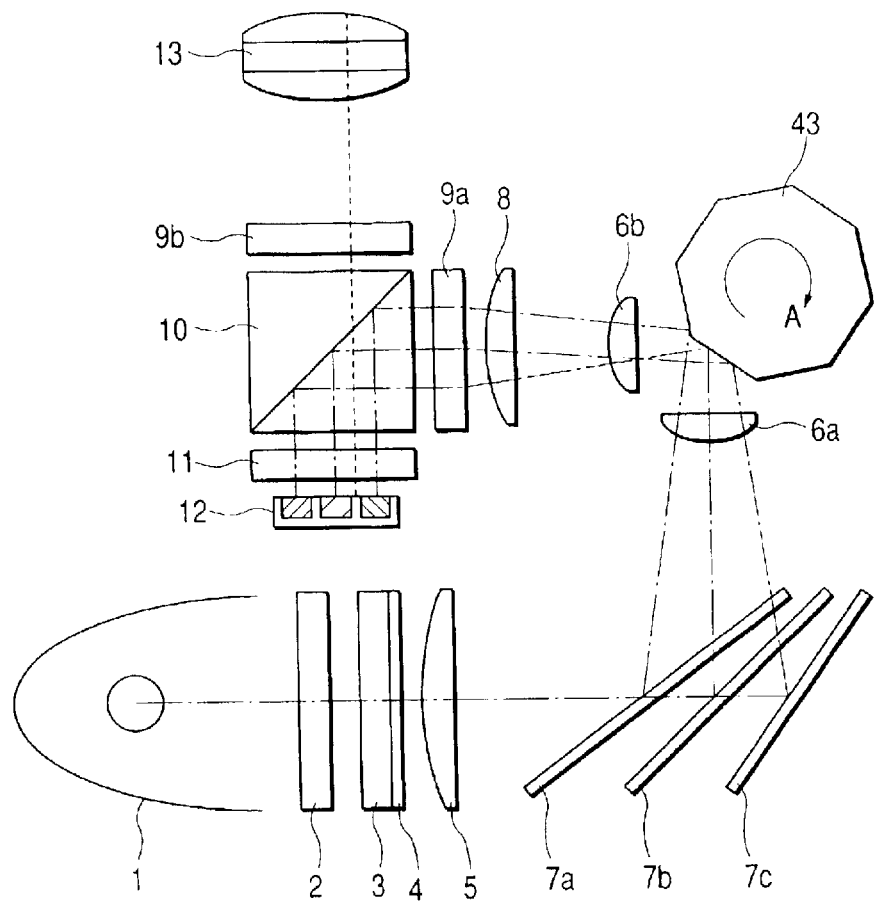
FIG. 5 is structural views showing the second embodiment of the optical unit of the invention and a flat view of the display element.
Figure 5B:
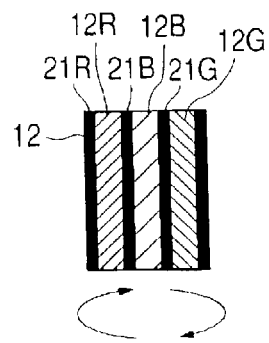

FIG. 3, FIG. 4 and FIG. 5 are structural views showing the second embodiment of the optical unit of the invention and flat views of the display element. FIG. 3A, FIG. 4A and FIG. 5A are structural views of the respective optical units. FIG. 3B, FIG. 4B and FIG. 5B are show locations on the display element irradiated by the red light, green light and blue light. In the figure, when the reflecting rotating multisurface element 43 is rotating in the direction of arrow A. FIG. 3A shows the embodiment when the red light, green light and blue light reflected by the dichroic mirror groups 7a, 7b, 7c is beamed upon one surface of the reflecting rotating multisurface element 43. In this case, as shown in FIG. 3B, the locations irradiated by the red light, green light and blue light, are 12R, 12G and 12B in sequence from left to right on the display element 12. The embodiment in FIG. 4A shows the case when the red light and green light reflected by the dichroic mirror groups 7a, 7b, 7c from among the red, blue and green light, are beamed upon one surface, and the blue light is beamed upon the next surface. In this case, as shown in FIG. 4B, the locations beamed upon by the red light, green light and blue light, are 12B, 12R and 12G in sequence, from the right, on the display element 12.

In the embodiment shown in FIG. 5A, only the red light from among the light reflected by the dichroic mirror groups 7a, 7b, 7c is beamed upon the surface, and the green light and blue light is beamed upon the next surface. In this case, as shown in FIG. 5B, the locations on which the red light, green light and blue light is beamed, are the locations 12G, 12B and 12R in sequence from the right on the display element 12.

Sections in FIG. 3 through FIG. 5 assigned with the same reference numerals are identical to the same sections in FIG.

1 so an explanation is omitted here. In FIG. 3 through FIG. 5, the point differing from FIG. 1 is that, the λ/2 wavelength plate 4a, and the second collimator lens 5b are omitted on the optical path from the light source 1 to the dichroic mirror group 7a, 7b, and 7c. The third collimator lens 5c is eliminated from the optical path from the dichroic mirror group 7a, 7b, and 7c to the reflecting rotating multisurface element 43 and a convergence lens 6a is used instead. The optical path has the same structure from the reflecting rotating multisurface element 43 to the projection lens 13. This embodiment operates the same as the embodiment of FIG. 1, and along with red light, green light and blue light beaming onto the respective locations 12a, 12b and 12c on the display element 12, those locations are moved in sequence in one direction on the display element 12, and a color image can be displayed on a screen (not shown in drawing) on one display element 12.

FIG. 3 shows the case when the red light, green light and blue light reflected by the dichroic mirror group 7a, 7b, and 7c are respectively converged on one surface of the reflecting rotating multisurface element 43. In this case, the optical axes of the red light, green light and blue light reflected from the reflecting rotating multisurface element 43 intersect between the light beam input surface of the PBS10 and the reflecting rotating multisurface element 43. The example in this embodiment described an eight surface element but there is no restriction on the number of surfaces.

When red light and green light are beamed upon one surface of the reflecting rotating multisurface element 43, and blue light is beamed on the next surface as shown in FIG. 4, the green light and red light are then beamed on the PBS10, after the optical axes of the green light and the red light reflected from the reflecting rotating multisurface element 43 intersect each other, however the optical axis of the blue light does not intersect with the axes of the red light and green light and is input to the PBS10.

When the red light is beamed upon one surface of the reflecting rotating multisurface element 43, and the green light and blue light are beamed on the next surface as shown in FIG. 5, the light is beamed onto the input surface of the PBS10 after the optical axes of the green light and blue light reflected from the next surface of the reflecting rotating multisurface element 43 have intersected each other.

It can be seen from the above description that when a plurality of light colors are beamed upon one surface of the reflecting rotating multisurface element 43, the light is beamed into the PBS10 after the optical axes of the plurality of light reflected from the reflecting rotating multisurface element 43 intersect.

The embodiment of the display device of the present invention is described next.

Figure 6:
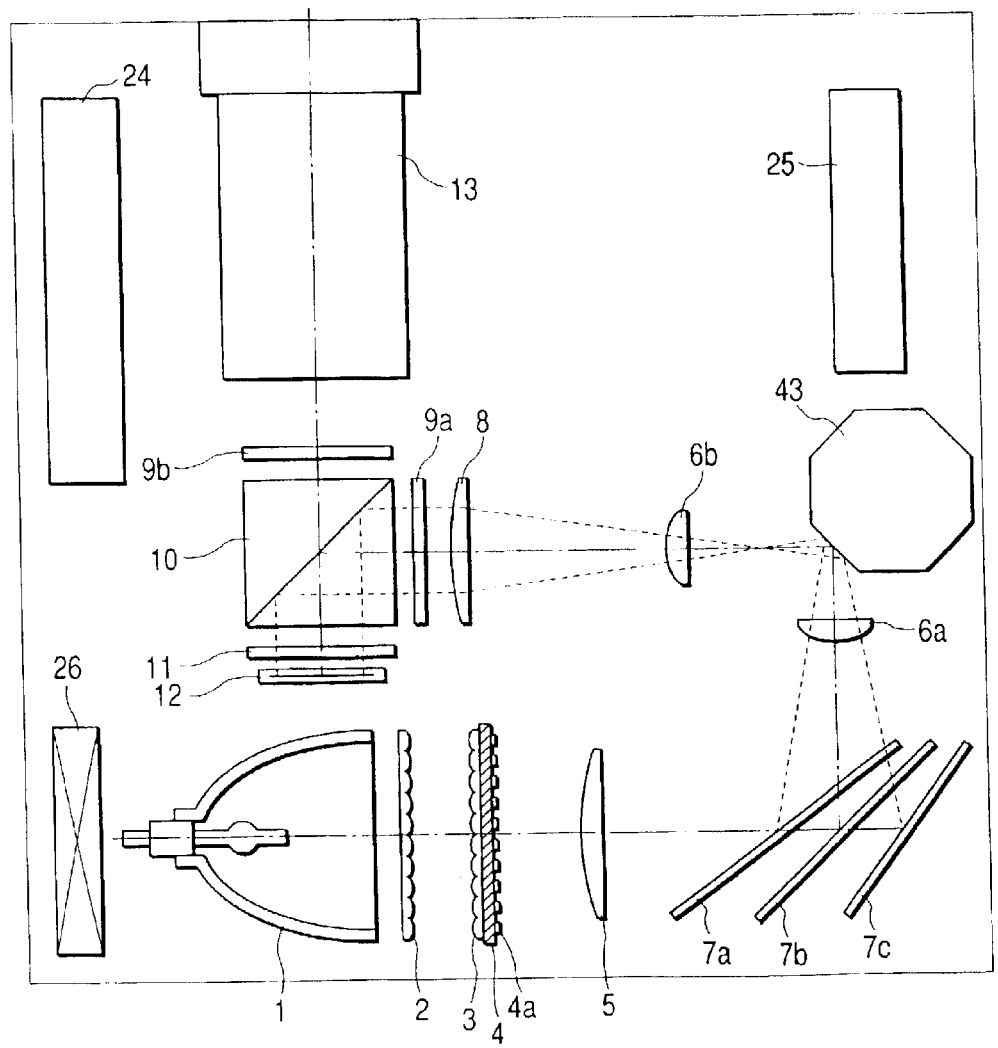
FIG. 6 is a structural view showing the first embodiment of the display device of the present invention.

FIG. 6 is a structural view showing the first embodiment of the display device of the present invention.

Sections in FIG. 1, and FIG. 3 through FIG. 5 assigned with the same reference numerals are identical to the same sections in this figure so an explanation is omitted here. In this embodiment, the optical path from the light source 1 to the dichroic mirror group 7a, 7b, and 7c is the same as the embodiment of FIG. 1, and the optical path from the dichroic mirror group 7a, 7b, and 7c to the projection lens 13 is the same as the optical path in FIG. 3 through FIG. 5. The operation of the optical unit of this embodiment is also the same as in FIG. 1 and FIG. 3 through FIG. 5 so that a color image can be shown on the screen (not shown in drawing) by the beaming of light from the projection lens 13.

In the embodiment of FIG. 6, the reference numeral 24 denotes a power supply, the reference numeral 25 denotes an image display circuit for processing image signals and the reference numeral 26 denotes an exhaust fan, and the image display device is comprised by mounting these components in an optical unit having an optical path from the light source 1 to the projection lens 13.

The embodiment when the direction from the light source 1 to the dichroic mirror group 7a, 7b, and 7c is the same as the direction from the reflecting rotating multisurface element 43 to the projection lens 13 is described next while referring to FIG. 7.

Figure 7:
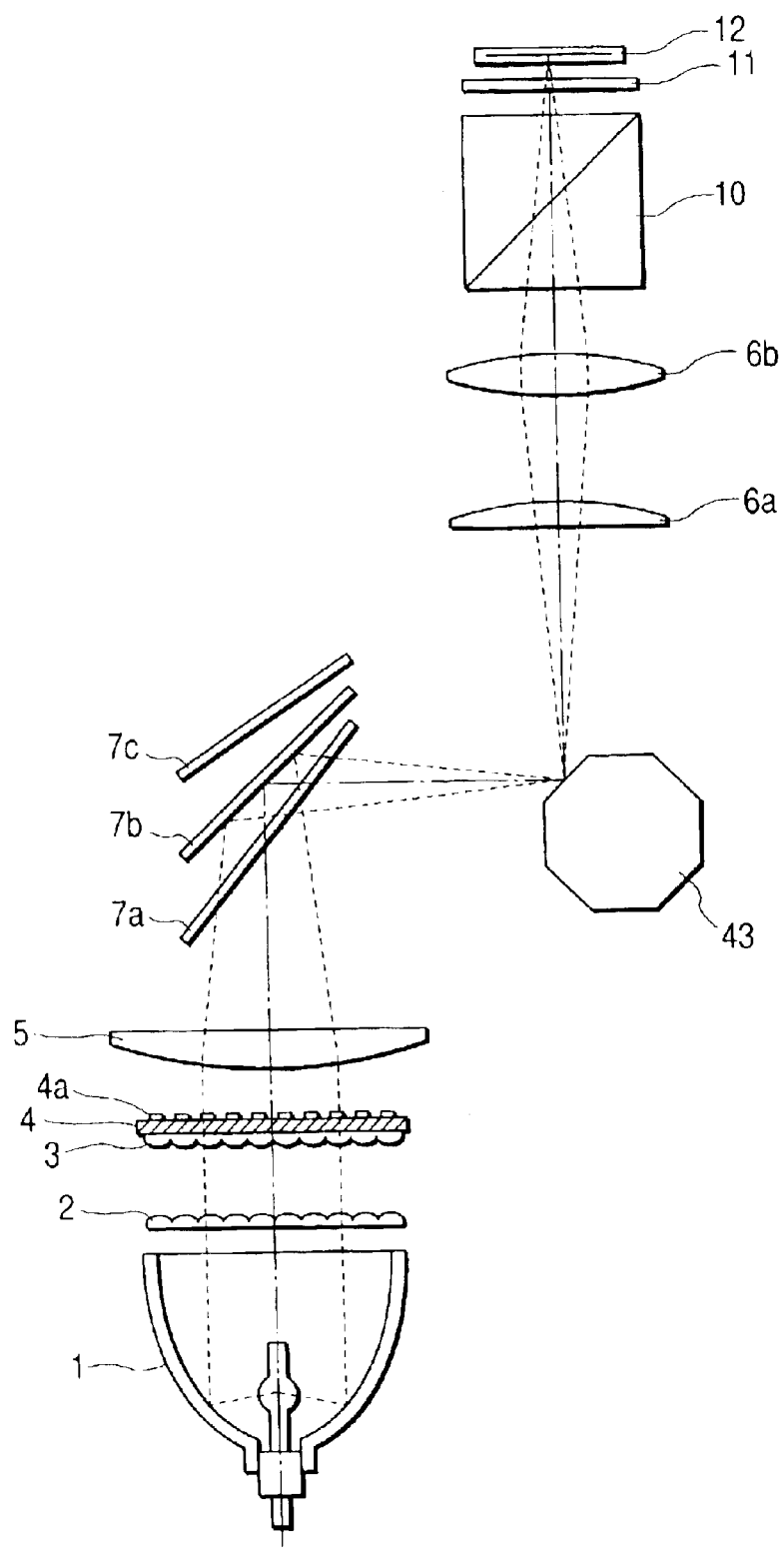
FIG. 7 is structural views showing the third embodiment of the optical unit of the present invention.

FIG. 7 is structural views showing the third embodiment of the optical unit of the present invention. Sections in the figure assigned with the same reference numerals are identical to the same sections in the embodiments of FIG. 1 and FIG. 3 through FIG. 5 so an explanation is omitted here.

The optical path between the light source 1 to the dichroic mirror group 7a, 7b, 7c is different from the optical path shown in FIG. 1 in that there is no second collimator 5b however the other components of the optical path are the same.

In the optical path from the dichroic mirror group 7a, 7b, and 7c to the reflecting rotating multisurface element 43 is different from the optical path shown in FIG. 1 in that there is no third collimator 5c, however this collimator 5c may also be used. Two types of converging lenses 6a, 6b are used in the optical path from the reflecting rotating multisurface element 43 to the PBS10. The structure from the PBS10 onwards is the same as shown in FIG. 1. The dotted line in FIG. 7 indicates the green light, while the dot-dash line indicates the optical axis of the green light. The optical axes of the red light and blue light are omitted but their optical axes can be shown as in FIG. 1.

In this embodiment, among the three (colors of) lights reflected from the dichroic mirror group 7a, 7b, and 7c, the light in the center, or in other words the green light is focused and converged on one surface of the reflecting rotating multisurface element 43. In this case, the red light and the blue light are beamed centered around the green light on the reflecting rotating multisurface element 43 so that each surface of the reflecting rotating multisurface element 43 can be made smaller compared to when the green light is converged onto other than the center of the reflecting rotating multisurface element 43.

Also in the present embodiment, the red light, green light and blue projected light can be emitted from the projection lens 13 on an optical axis approximately in parallel with the optical axis of the dichroic mirror group 7a, 7b, and 7c from the light source 1.

There is no restriction here on the collimator lens and these may be installed behind the dichroic mirror group 7a, 7b, and 7c. The particular features of the dichroic mirror group 7a, 7b, and 7c may also be interchanged such as by either of the combinations of RGB, BGR however, weak light wavelengths should have priority according to the output of the light source serving as the light source, in other words, the initial reflection method is satisfactory for reducing the permeance (transmittance) count.

The fourth embodiment of the present invention is described next while referring to FIG. 8.

Figure 8:
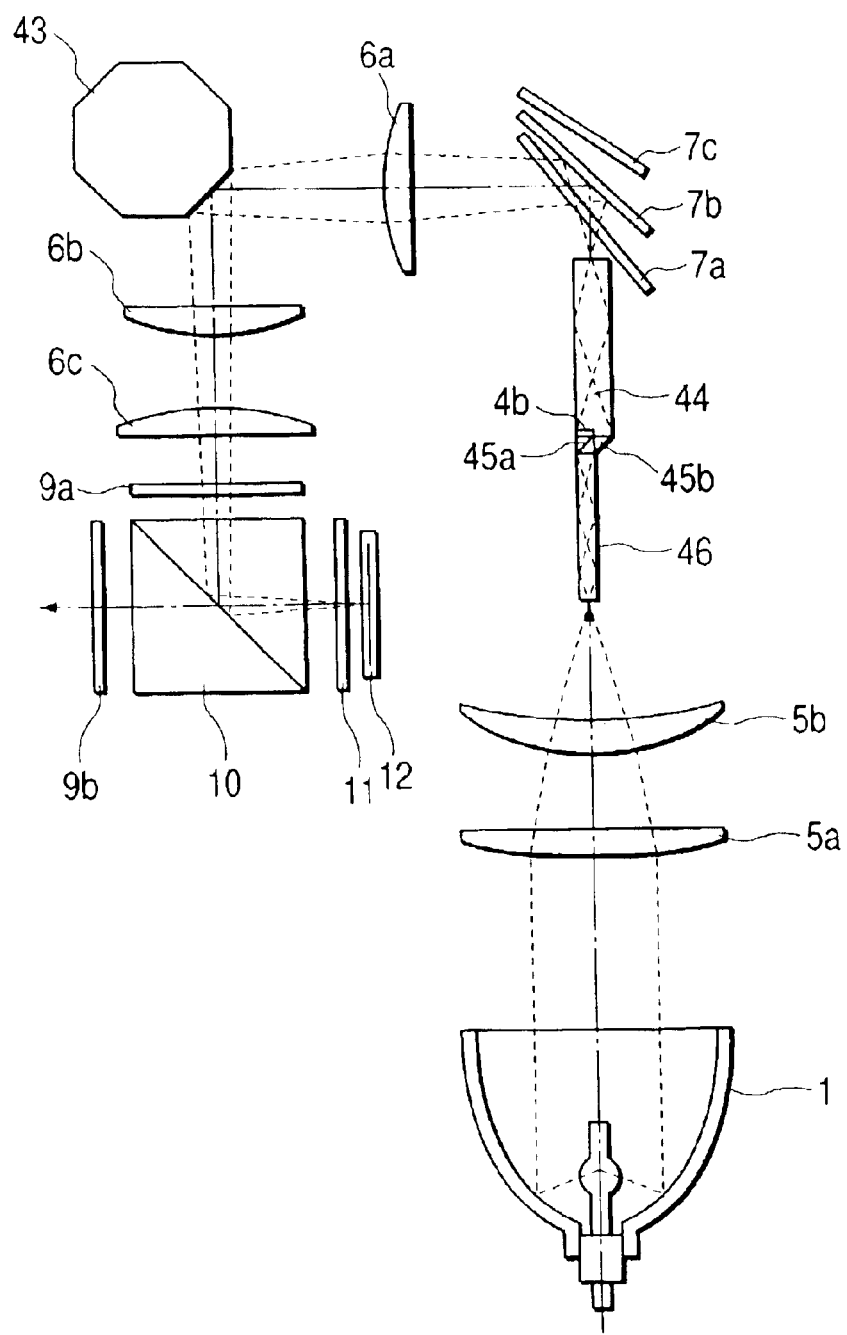
FIG. 8 is structural views showing the fourth embodiment of the optical unit of the present invention.

FIG. 8 is a structural view showing the fourth embodiment of the optical unit of the present invention. In this figure, after the light from the light source 1 has passed through the first collimator lens 5a and the second collimator lens 5b, the light is input to the first light pipe 46. The polarization direction of the light is aligned by the PBS45a, PBS or the full reflecting prism or the full reflecting mirror 45b, or the λ/2 wavelength plate 4b while reflecting from the internal surface of the first light pipe 46 and advancing, and is input for example as S polarized light to the second light pipe 44. The S polarized light input to the second light pipe 44 advances while reflecting from the internal surfaces of the second light pipe 44 and the red light, green light and blue light are respectively reflected from the dichroic mirror group 7a, 7b, and 7c and are input to the reflecting rotating multisurface element 43. The red light, green light and blue light reflected from the reflecting rotating multisurface element 43 pass through the first converging lens 6a, second converging lens 6b, third convergence lens 6c and polarizing plate 9a and are input to the PBS10. The optical path from there onwards is the same as in the case of FIG. 1.

A color image can also be displayed on the screen in this embodiment. Also in this embodiment, light projected from the projection lens 13 can be emitted on an optical path in a direction perpendicular to the optical axis of light from the dichroic mirror group 7a, 7b, and 7c and light source 1.

In this embodiment, the light is formed into S polarized light by means of the PBS 45a and the fully reflecting prism 45b so that a line or streak can be obtained between the S polarized light emitted from S polarized light emitted from the PBS 45A and the S polarized light emitted from the fully reflecting prism 45b. When these two S polarized lights pass through the second light pipe 44, the line or streak occurring among the two S polarized lights is eliminated by reflection of the two S polarized lights internally in the second light pipe 44. If not concerned with the line or streak occurring among the two S polarized lights, then the second light pipe 44 for aligning the S polarized light may be omitted.

Insertion of the PBS45a causes the width of the light of the light pipe 46 to enlarge in one direction to approximately twice the original size so the shape of the output beam opening of the light pipe 44 can easily be made to a similar shape (band rectangular shape) as the scroll band shape on the display element. Also the input opening shape of the light pipe 46 can be designed to a shape (for example, an approximately square shape) to match the light spot shape, so that light loss can be limited and the light can easily be extended to a rectangular shape and extremely good efficiency obtained. The output light beam opening of the light pipe 44 can also be made to reconverge light onto the display element without having to form a rectangular aperture so that there is no need to cutoff the light such as by using a rectangular aperture and the efficiency is good.

When a micromirror type image display element is utilized as the display element 12 in this embodiment, there is no need to align the direction of the polarized light so that the PBS45a, the fully reflecting prism or the fully reflecting mirror 45b, and the λ/2 wavelength plate 4b are not needed.

The fifth embodiment of the optical unit of the present invention is described next.

Figure 9:
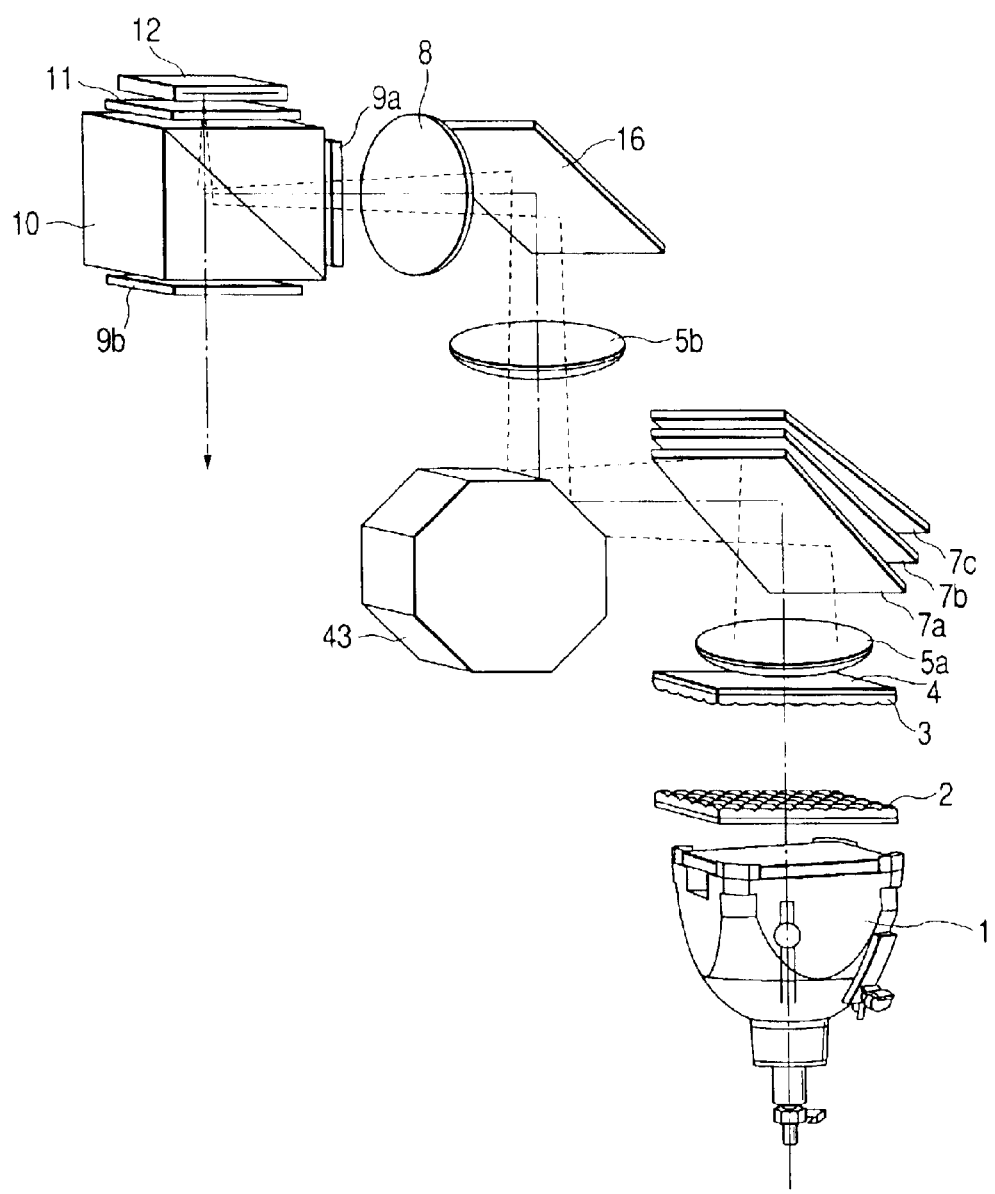
FIG. 9 is structural views showing the fifth embodiment of the optical unit of the present invention.

FIG. 9 is structural views showing the fifth embodiment of the optical unit of the present invention. In the figure, the dotted line indicates only the green light and the dot-dashed line indicates the green light optical axis. The optical axes of the other colors of light are the same as for example in FIG. 1. Sections in the figure having the same reference numbers as in FIG. 1 have the element functions so a description is omitted.

In this embodiment, the light from the light source 1 is input to a first array lens 2 for forming a plurality of secondary light source images, and passed through a second array lens 3 formed by a plurality of focusing lenses installed in the vicinity where the plurality of secondary light source images are formed, and that converges each of the lens images of the first array lens 2 onto the liquid crystal display element 12. The mixed light of P polarized light and S polarized light that passed the second array lens 3 is aligned into S polarized light by the polarized beam splitter 4, and by means of the first collimator lens 5a, the red light, green light and blue light are respectively reflected by the red dichroic mirror 7a for reflecting red light, the green dichroic mirror 7b for reflecting green light, and blue dichroic mirror or reflecting mirror 7c for reflecting blue light (An ultraviolet permeable mirror may be used, and if the structure reflects the red light last, then may comprise an IR permeable mirror.). The red light, green light and blue light irradiate onto respectively different locations on the reflecting rotating multisurface element 43 and are reflected by the reflecting rotating multisurface element 43. After the red light, blue light and green light reflecting from the reflecting rotating multisurface element 43 have passed through the second collimator lens 5b, and been reflected by the reflecting mirror 16, the optical path is changed approximately 90 degrees and passes through the condenser lens 8. The red light, blue light and green light that passed through the condenser lens 8, passed through the first polarizing plate 9a, is reflected by the PBS10, passes through the λ/4 wavelength plate 11 and is input to the reflecting type display element 12. The red light, blue light and green light converted into P polarized light at the display element 12, passes this time through the PBS10, and is output by the second polarizing plate 9b. The optical axis emitted from PBS10 is parallel to the direction of the light from the light source 1 and is output facing opposite the light from the light source 1.

In this embodiment, an optical unit can be configured without using a convergence optical system.

An example is next described using a transmissible rotating polygonal mirror in the optical unit.

Figure 10A:
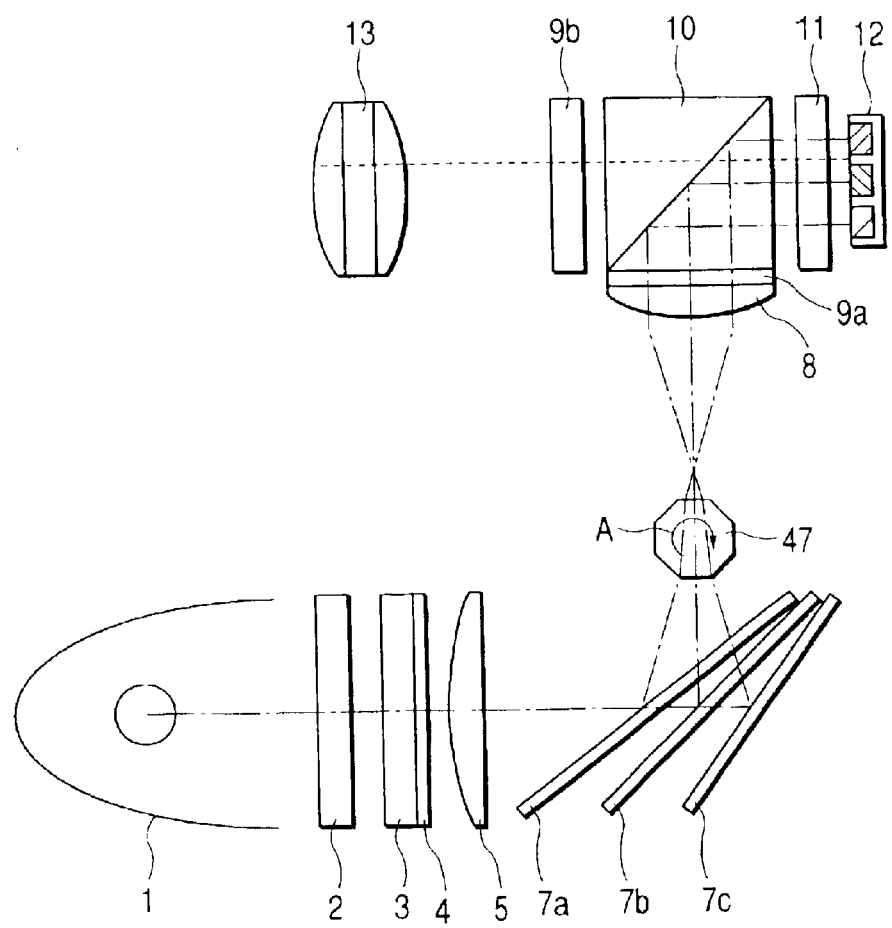
FIG. 10 is structural views showing the sixth embodiment of the optical unit of the present invention and a flat view of the display element.
Figure 10B:
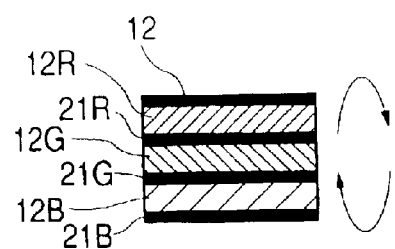
Figure 11A:
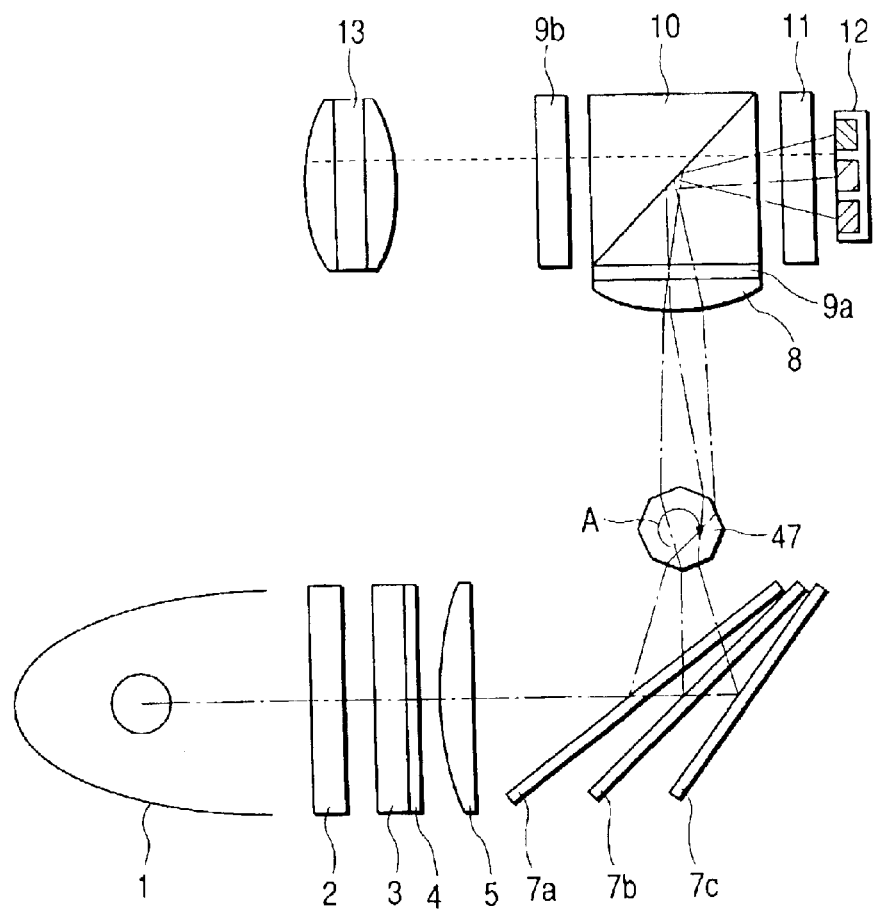
FIG. 11 is structural views showing the sixth embodiment of the optical unit of the present invention and a flat view of the display element.
Figure 11B:
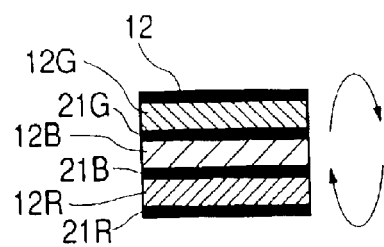
Figure 12A:
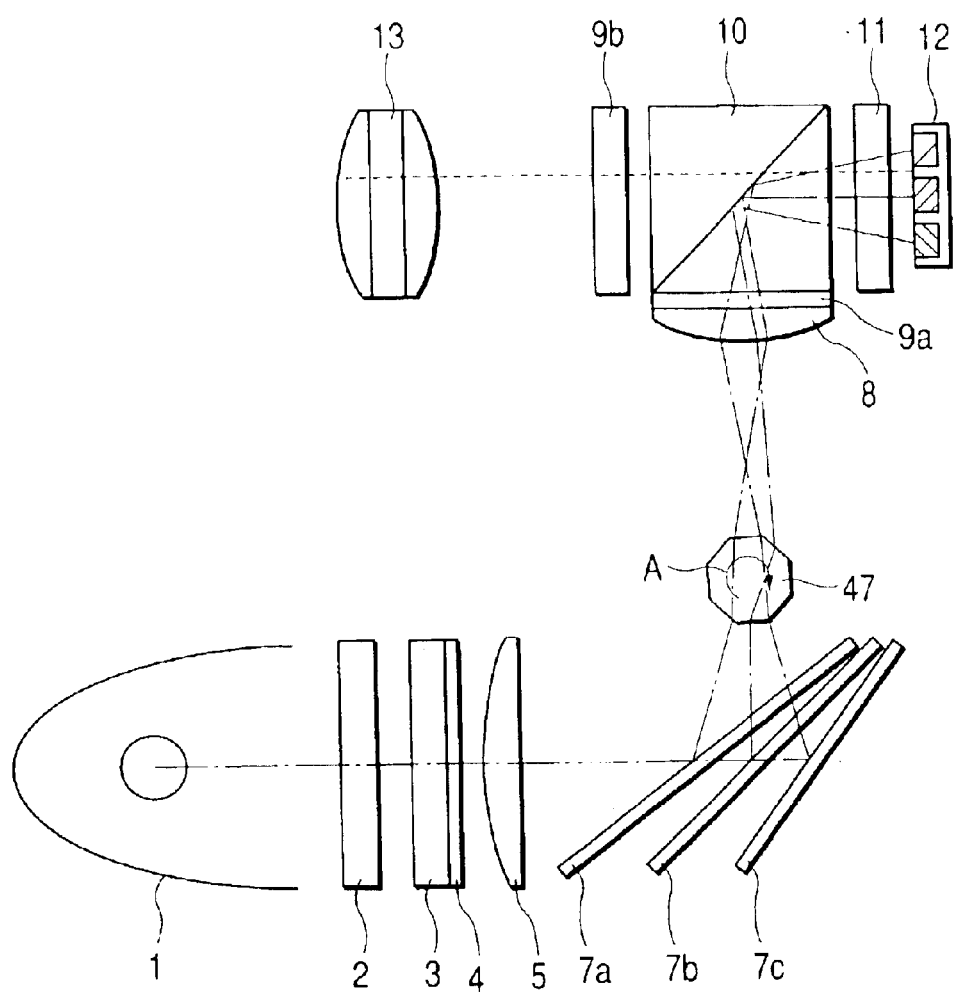
FIG. 12 is structural views showing the sixth embodiment of the optical unit of the present invention and a flat view of the display element.
Figure 12B:
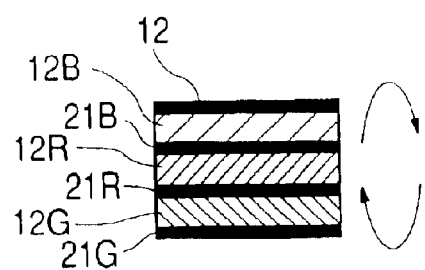

FIG. 10, FIG. 11 and FIG. 12 are structural views showing the sixth embodiment of the optical unit of the present invention and flat views of the display element. FIG. 10A, FIG. 11A and FIG. 12A are structural drawings of the respective optical units. FIG. 10B, FIG. 11B and FIG. 12B show locations on the display element irradiated by the red light, green light and blue light.

FIG. 10A shows the case when the red light, green light and blue light irradiate (beam) onto one surface of the transmissible rotating polygonal mirror with optical paths of mutually different directions, and the red light, green light and blue light are emitted from a surface facing that one surface. The red light, green light and blue light irradiate (beam) respectively in sequence from the top, onto the locations 12R, 12G and 12B on the surface of the display element 12 as shown in FIG. 10B. The embodiment in FIG. 11, shows the case when the red light, green light and blue light irradiate (beam) onto two surfaces of the transmissible rotating polygonal mirror 43 from optical axes of mutually different directions, and the red light, green light and blue light are emitted from surfaces opposing (facing) those two surfaces. As shown in FIG. 11B, the red light, green light and blue light is irradiated onto the locations 12G, 12B and 12R in sequence from above, on the surface of the display element 12. The embodiment in FIG. 12A shows the case when the red light, green light and blue light irradiate (beam) onto two surfaces of the transmissible rotating polygonal mirror 43 from optical axes of mutually different directions, and the red light, green light and blue light are emitted from surfaces opposing (facing) those two surfaces, and as shown in FIG. 12B, the red light, green light and blue light irradiate (beam) in sequence from above, onto the locations 12B, 12R and 12G on the display element 12.

In FIG. 10 through FIG. 12, the light from the light source 1 passes through the first array lens 2 and the second array lens 3, and the polarity of the light is aligned by the PBS4, and passes through the collimator lens 5 for example as S polarized light, and the red light, green light and blue light are respectively reflected by the red dichroic mirror 7a for reflecting red light, the green dichroicmirror 7b for reflecting green light, and a blue dichroic mirror or reflecting mirror 7c for reflecting blue light. The red light, green light and blue light reflected by the dichroic mirror group 7a, 7b, 7c pass the transmissible rotating polygonal mirror 47. The red light, green light and blue light permeating through the transmissible rotating polygonal mirror 47, then passes through the condenser lens 8 and the first polarizing plate 9a, is reflected by the λ/4 wavelength plate 11 and is input to the reflecting type display element 12.

The red light, green light and blue light reflected at this display element 12 and polarized into P polarized light, passes the PBS10 and is input to the projection lens 13. In this embodiment, the direction of the light emitted from the projection lens 13 is approximately parallel with the direction of light emitted from the light source 1, and faces the opposite direction.

In the embodiments in FIG. 10 through FIG. 12, the transmissible rotating polygonal mirror 47 rotates clockwise (direction of arrow A) as seen in the drawing.

In FIG. 10, the red light, green light and blue light reflected by the dichroic mirror group 7a, 7b, 7c on mutually different optical axes, are input to one surface of the transmissible rotating polygonal mirror 47, pass through the transmissible rotating polygonal mirror 47, and after being emitted from a surface facing the transmissible rotating polygonal mirror 47, these optical axes intersect and are input to the condenser lens 8.

In FIG. 11, the transmissible rotating polygonal mirror 47 is rotated clockwise in the case of FIG. 10, and the red light input to one surface, and the green light and blue light input to the next surface, and the respective red light, green light and blue light pass the transmissible rotating polygonal mirror 47, the red light is emitted from a surface different from the surface facing the one surface (of the multisurface element 47), the green light is input from the next surface, and emitted from a surface facing that surface, the blue light is input from the next surface, and emitted from a surface different from the surface facing that one surface. In this embodiment, the green light and blue light input from different surfaces, are emitted from different surfaces and after intersecting, are input to the PBS10.

In FIG. 12, the red light is input to one surface of the transmissible rotating polygonal mirror 47, and the green light and blue light input from the next surface, and the red light, green light and blue light respectively pass the transmissible rotating polygonal mirror 47. The red light is output from the surface facing the next surface, the green light is output from the surface facing the one surface, and the blue light is output from the surface facing the next surface. After the red light and blue light output from the surface facing the next surface have intersected, they pass the condenser lens and are input to the PBS10.

In the embodiments from FIG. 10 through FIG. 12, at least two of the red light, green light and blue light intersect after being output from the transmissible rotating polygonal mirror 47.

In this embodiment, any material capable of permeating light can be used as the material for the transmissible rotating polygonal mirror 47. Also, the number of surfaces of the transmissible rotating polygonal mirror 47 is not limited to eight surfaces and any polyangular shape can be utilized if having three or more sides. There are further no restrictions on the size of the transmissible rotating polygonal mirror 47.

The invention as described above can irradiate a respective plurality of colors on different locations on one display element by utilizing a dichroic mirror group to separate and reflect light into a plurality of colors, and a rotating multisurface element to change the direction of this plurality of colors; furthermore, the locations irradiated (or beamed upon) on the display element by the plurality of colors can be sequentially changed in one direction by rotating the rotating multisurface element, so that a color image can be obtained using one display element that further has a simple structure.

Also in this invention, the light from the light source is separated into a plurality of colors and this separated plurality of light colors can be irradiated with good efficiency upon a display element so that the utilization efficiency of the light is good.

In this invention, only one rotating multisurface element is used so that the positioning of the plurality of light colors irradiated upon the display element is simple.

In this invention therefore, as described above, an optical unit having a simple single plate type structure can be obtained. An optical unit having good light utilization efficiency can be obtained. Further, an optical unit having good simple positioning of the plurality of colors on the display element can also be obtained.

What is claimed is:

1. An optical unit comprising:
   a light source;
   an image display element to form an optical image according to an image signal output from the light emitted from said light source;
   an optical element through which the light from said light source is passed with reflection therein;
   a color separator for separating the light emitted from said light source into a first light color, a second light color and a third light color;
   a rotating multisurface element irradiated with the light from said color separator for controlling the respective reflected direction of the optical axes of said first light color, said second light color and said third light color so as to irradiate the respective said first light color, said second light color and said third color onto different locations on said display element while scrolling said different locations irradiated by said first light color, said second light color and said third color in the same said direction; and
   a projection device for projecting light emitted from said image display element as a color image;
   wherein said optical element is composed such that the area of the light emitting surface of said optical element is larger than that of the light incidence surface of said optical element.

2. An optical unit according to claim 1, wherein said light emitting surface of said optical element has a light output opening and said light incidence surface of said optical element has a light input surface.

3. An optical unit according to claim 2, wherein the shape of said light input opening of said incidence surface of said optical element is substantially the same with the shapes of said light source or substantially square.

4. An image display device comprising:

a light source;

an image display element to form an optical image according to an image signal output from the light emitted from said light source;

an optical element through which the light from said light source is passed with reflection therein;

a color separator for separating the light emitted from said light source into a first light color, a second light color and a third light color;

a rotating multisurface element irradiated with the light from said color separator for controlling the respective reflected direction of the optical axes of said first light color, said second light color and said third light color so as to irradiate the respective said first light color, said second light color and said third color onto different locations on said display element while scrolling said different locations irradiated by said first light color, said second light color and said third color in the same direction;

a projection device for projecting light emitted from said image display element as a color image;

an image processor circuit; and a power supply;

wherein said optical element is composed such that the area of the light emitting surface of said optical element is larger than that of the light incidence surface of said optical element.

5. An image display device according to claim 4, wherein said light emitting surface of said optical element has a light output opening and said light incidence surface of said optical element has a light input surface.

6. An image display device according to claim 5, wherein the shape of said light input opening of said incidence surface of said optical element is substantially the same with the shapes of said light source or substantially square.

* * * * *